(12) United States Patent
Shimizu et al.

(10) Patent No.: US 6,610,756 B1
(45) Date of Patent: Aug. 26, 2003

(54) INORGANIC/ORGANIC COMPOSITE FOAM AND PROCESS FOR PRODUCING THE SAME

(75) Inventors: Tomokazu Shimizu, Kyoto (JP); Tadaaki Yamazaki, Kyoto (JP); Shinzo Kaida, Kyoto (JP); Tsuyoshi Tomosada, Kyoto (JP)

(73) Assignee: Sanyo Checmical Industries, Ltd., Kyoto (JP)

( * ) Notice: Subject to any disclaimer, the term of this patent is extended or adjusted under 35 U.S.C. 154(b) by 0 days.

(21) Appl. No.: 09/462,043

(22) PCT Filed: Jun. 17, 1998

(86) PCT No.: PCT/JP98/02711

§ 371 (c)(1),
(2), (4) Date: Dec. 30, 1999

(87) PCT Pub. No.: WO99/02468

PCT Pub. Date: Jan. 21, 1999

(30) Foreign Application Priority Data

Jul. 8, 1997 (JP) .............................. 9-199259
Jul. 10, 1997 (JP) .............................. 9-202251

(51) Int. Cl.$^7$ .................................. C08J 9/08
(52) U.S. Cl. .................. 521/103; 521/106; 521/85; 521/89; 521/120; 521/159; 521/168
(58) Field of Search ............ 521/85, 89, 103, 521/106, 120, 159, 168

(56) References Cited

U.S. PATENT DOCUMENTS

| | | | |
|---|---|---|---|
| 3,153,013 A | 10/1964 | Campbell | |
| 3,245,922 A | 4/1966 | Worsley et al. | |
| 4,361,692 A | 11/1982 | Ammons | |
| 4,369,064 A | 1/1983 | von Bonin | |
| 4,871,477 A | 10/1989 | Dimanshteyn | |
| 5,110,840 A | 5/1992 | Blount | |
| 5,830,319 A | * 11/1998 | Landin | 106/18.14 |

FOREIGN PATENT DOCUMENTS

| | | |
|---|---|---|
| GB | 919067 | 2/1963 |
| JP | 50-86563 | 7/1975 |
| JP | 50-86564 | 7/1975 |
| JP | 50-87164 | 7/1975 |
| JP | 51-109044 | 9/1976 |
| JP | 56-55434 | 5/1981 |
| JP | 6-24869 | 2/1994 |
| JP | 2-150433 | 6/1999 |
| WO | WO97/11925 | * 4/1997 |

OTHER PUBLICATIONS

Jun. 23, 1999, English translation of International Preliminary Examination Report.
Lewis, Richard J. "Hawley's Condensed Chemical Dictionary", 13th ed., John Wiley & Sons, Inc.: New York, 1997, pp. 156,1196.*

* cited by examiner

Primary Examiner—James J. Seidleck
Assistant Examiner—Melanie Bissett
(74) Attorney, Agent, or Firm—Merchant & Gould P.C.

(57) ABSTRACT

An inorganic/organic composite foam that has a foam structure obtained from a combination of a phosphoric acid compound and/or a sulfuric acid compound with a blowing agent therefor, has reduced brittleness due to a cured material of an urethane prepolymer having NCO groups, and contains a powdery boric acid compound, and a process for producing the same. The foam is not only reduced in brittleness but also improved in foam strength after combustion due to the incorporation of the powdery boric acid compound while retaining inherent foam properties and inherent low quantities of heat of combustion and smoking in combustion. It is used in exterior wall panels, heat insulating materials, sound insulating materials, fireproof covering materials, lightweight aggregates, filling materials for cavities, and the like, which are required to have fireproofing performance.

17 Claims, No Drawings

US 6,610,756 B1

INORGANIC/ORGANIC COMPOSITE FOAM AND PROCESS FOR PRODUCING THE SAME

TECHNICAL FIELD

The present invention relates to an inorganic/organic composite foam and a process for producing the same. More particularly, the present invention relates to an inorganic/organic composite foam that has an inorganic foam structure, is reduced in brittleness significantly due to an elastic polymer, is in no way inferior to foams having good flexibility and rebound resilience such as polyurethane or polystyrene foams, and has a fire-proofing performance; and to a process for producing an inorganic/organic composite foam that can be formed under the conditions of room temperature and normal pressure.

BACKGROUND ART

Traditionally, foams of phosphoric acid compounds have been proposed as inorganic foams that can be formed under the conditions of room temperature and normal pressure (e.g. JP 56-36145 B).

The foam described in this publication is obtained by mixing and stirring a phosphoric acid compound, such as a metal phosphate, and a blowing agent, such as a multivalent metal carbonate, and thereby foaming and curing the mixture. This foam may be used not only in shaped materials such as panels, but also in unshaped materials for filling open spaces. It is regarded as an excellent material different from conventional foams, because of the following characteristics:

(1) The obtained foam is excellent in non-combustibility and fireproof property.
(2) The specific gravity of the foam can be controlled easily in a wide range in the production of the foam.
(3) The foam has a self-blowing property.

However, the foam of a phosphoric acid compound is a complete inorganic material and thus has brittleness. Therefore, there has been a drawback that its cells may be destroyed even with a little external force, and cannot be restored. Particularly, when a large panel having a low specific gravity is made from a foam of a phosphoric acid compound, there are problems, for example, that a mere touch may destroy its surface layer, or that the strength of the panel is too low to carry the panel. Thus, it has never been a suitable material that stands for practical uses.

In order to overcome such a drawback in a foam of a phosphoric acid compound, a method of further adding an urethane prepolymer to the raw material composition has been proposed (e.g. JP 9-157061 A).

In this method, in the case of a foam with a high blowing ratio, by the use of the urethane prepolymer, in spite of being an inorganic/organic composite, the foam can have good flexibility and rebound resilience just like a flexible polyurethane foam. Furthermore, the foam can obtain various properties from soft to hard depending on the composition of the urethane prepolymer used, and brittleness can be reduced significantly in both soft and hard foams.

Thus, by the use of the urethane prepolymer, the brittleness of the foam with a high blowing ratio is reduced, and further, the foam can have good flexibility and rebound resilience just like a flexible polyurethane foam. Moreover, the quantities of heat of combustion and smoking in combustion can be much decreased than in the cases of the organic foams. However, because the foam has a low strength after combustion, it may collapse when it is exposed to a flame for a long time.

SUMMARY OF INVENTION

It is an object of the present invention to solve these problems and provide a foam excellent in avoiding disaster, which has an improved strength after combustion and can delay the spreading of fire, by adding a powdery boric acid compound to a foam obtained from a phosphoric acid compound and/or a sulfuric acid compound that has a reduced brittleness due to a cured material of an urethane prepolymer, while retaining inherent foam properties and inherent low quantities of heat of combustion and smoking in combustion, and a process for producing the same.

That is, the present invention provides an inorganic/organic composite foam that has a foam structure obtained from a phosphoric acid compound (a1) and/or a sulfuric acid compound (a2) with a blowing agent (b), is reduced in brittleness due to a cured material of an urethane prepolymer (c) having NCO groups, and contains a powdery boric acid compound (d); and a process for producing an inorganic/organic composite foam comprising mixing components comprising a phosphoric acid compound (a1) and/or a sulfuric acid compound (a2), a blowing agent (b), an urethane prepolymer (c) having NCO groups, a powdery boric acid compound (d) and water, in combination with or without an inorganic filler (e), and thereby foaming and curing the mixture.

DETAIL DESCRIPTION OF THE INVENTION

The foam of the present invention is obtained by mixing components comprising the phosphoric acid compound (a1) and/or the sulfuric acid compound (a2), the blowing agent (b), the prepolymer (c), the powdery boric acid compound (d), and as needed the inorganic filler (e) so as to prepare an aqueous mixture, and thereby foaming and curing the mixture. That is, the foam of the present invention is obtained by preparing this aqueous mixture so that a foaming and curing reaction between (a1) and/or (a2) and (b), and a foaming and curing reaction between (c) and water proceed.

In the present invention, examples of the phosphoric acid compound (a1) include phosphoric acid, phosphorous acid, phosphoric anhydride, condensed phosphoric acid, multivalent metal salts of these compounds, and mixtures of two or more of these. The multivalent metal salts of phosphoric acid may be, for example, dihydrogenphosphates of multivalent metals, monohydrogenphosphates of multivalent metals, or phosphates of multivalent metals.

Furthermore, examples of the metal of the multivalent metal salts include magnesium, calcium, aluminum, zinc, barium, iron, and the like. Other than adding in the forms of multivalent metal phosphates or multivalent metal phosphites, these multivalent metal components also may be formed into multivalent metal salts by adding metal compounds that are chemically active to phosphoric acid or phosphorous acid, e.g. multivalent metal oxides such as magnesium oxide or calcium oxide, or multivalent metal hydroxides such as aluminum hydroxide, magnesium hydroxide, or calcium hydroxide, to the raw material mixture separately from phosphoric acid, phosphorous acid, and the like, and allowing the mixture to react.

Among the above examples of the phosphoric acid compound (a1), preferable are phosphoric acid, magnesium dihydrogenphosphate, calcium dihydrogenphosphate, aluminum dihydrogenphosphate, zinc dihydrogenphosphate, and mixtures of two or more of these. Particularly preferable are phosphoric acid, magnesium dihydrogenphosphate, aluminum dihydrogenphosphate, and mixtures of two or more of these.

In the present invention, examples of the sulfuric acid compound (a2) include sulfuric acid, sulfurous acid, multivalent metal salts of these compounds, and mixtures of two or more of these. The multivalent metal salts of sulfuric acid may be, for example, hydrogen sulfates of multivalent metals or sulfates of multivalent metals.

Furthermore, examples of the metals of the multivalent metal salts include magnesium, calcium, aluminum, zinc, barium, iron, and the like. Other than adding in the forms of multivalent metal sulfates or multivalent metals sulfites, these multivalent metal components also may be formed into multivalent metal salts by adding metal compounds that are chemically active to sulfuric acid or sulfurous acid, e.g. multivalent metal hydroxides such as aluminum hydroxide, magnesium hydroxide, or calcium hydroxide, to the raw material mixture separately from sulfuric acid, sulfurous acid, and the like, and allowing the mixture to react.

Among the above examples of the sulfuric acid compound (a2), preferable are sulfuric acid, calcium hydrogen sulfate, magnesium hydrogen sulfate, zinc hydrogen sulfate, aluminum hydrogen sulfate, and mixtures of two or more of these. Particularly preferable are sulfuric acid, magnesium hydrogen sulfate, calcium hydrogen sulfate, and mixtures of two or more of these.

The content of the phosphoric acid compound (a1) and/or the sulfuric acid compound (a2) is usually from 3 to 50 wt. % in the total components of the foam, from the standpoint of the fire-proofing performance and the structural uniformity of the foam.

In the present invention, examples of the blowing agent (b) include carbonate compounds (b1), light metals (b2) that generate gases by reacting with acids or alkalis, and the like.

Specific examples of the carbonate compounds (b1) include sodium carbonate, sodium hydrogen carbonate, potassium carbonate, ammonium carbonate, calcium carbonate, barium carbonate, magnesium carbonate, zinc carbonate, and the like. Specific examples of the light metals (b2) include magnesium, aluminum, zinc, and the like.

Among the above examples of the blowing agent (b), preferable are calcium carbonate and magnesium carbonate.

The amount of the blowing agent (b) may be determined depending on a wide range of blowing ratio for soft to hard foams as desired. The amount of (b) is not particularly limited as long as (a1) and/or (a2) and (b) can be mixed well during the preparation of the aqueous mixture, but it is usually from 0.1 to 200 parts by weight, preferably from 1 to 100 parts by weight with respect to 100 parts by weight of the phosphoric acid compound (a1) and/or sulfuric acid compound (a2).

In the present invention, examples of the urethane prepolymer (c) having NCO groups are those derived from organic polyisocyanate compounds (n) and active hydrogen containing compounds (h) and have NCO in their molecules.

Examples of the organic polyisocyanate compounds (n) include (n1) to (n5) below. However, the carbon atoms in NCO groups are not counted in determining the number of the carbon atoms in (n1) to (n5).

(n1) aliphatic polyisocyanates having 2 to 12 carbon atoms.
(n2) alicyclic polyisocyanates having 4 to 15 carbon atoms.
(n3) araliphatic polyisocyanates having 8 to 12 carbon atoms.
(n4) aromatic polyisocyanates having 6 to 20 carbon atoms.
(n5) modified materials of these polyisocyanates.

Specific examples of the aliphatic polyisocyanates (n1) include:

ethylene diisocyanate,
tetramethylene diisocyanate,
hexamethylene diisocyanate (HDI),
dodecamethylene diisocyanate,
2,2,4-trimethylhexamethylene diisocyanate,
lysine diisocyanate, and
1,3,6-hexamethylene triisocyanate.

Specific examples of the alicyclic polyisocyanates (n2) include:

isophorone diisocyanate (IPDI),
dicyclohexylmethane-4,4'-diisocyanate (hydrogenated MDI),
1,4-cyclohexane diisocyanate,
methylcyclohexane-2,4-diisocyanate (hydrogenated TDI), and
1,4-bis(2-isocyanate ethyl)cyclohexane.

Specific examples of the araliphatic polyisocyanates (n3) include:

p-xylylene diisocyanate, and
tetramethyl xylene diisocyanate.

Specific examples of the aromatic polyisocyanate (n4) include:

1,4-phenylene diisocyanate,
2,4- or 2,6-toluene diisocyanate (TDI),
diphenylmethane-2,4'- or -4,4'-diisocyanate (MDI),
naphthalene-1,5-diiocyanate,
3,3'-dimethyldiphenylmethane-4,4'-diisocyanate,
crude TDI, and
polyphenylmethane polyisocyanate (crude MDI).

Specific examples of the modified materials of the polyisocyanates (n5) include modified materials in which a carbodiimide group, uretdion group, uretone-imine group, urea group, biuret group, isocyanurate group, urethane group, or the like is introduced in the above-mentioned polyisocyanates.

The choice of these organic polyisocyanate compounds (n) is not particularly limited, and these compounds can be used either singly or in arbitrary combinations as components for deriving the urethane prepolymer, based on the foam properties and the cost.

Examples of the active hydrogen containing compounds (h) include (h1) to (h7) below:

(h1) alcohols,
(h2) polyoxyalkylene polyols,
(h3) polyester polyols,
(h4) polyolefin polyols,
(h5) acrylic polyols,
(h6) castor oil based polyols, and
(h7) polymer polyols.

Specific examples of the alcohols (h1) include aliphatic dihydric alcohols having 2 to 12 carbon atoms (e.g. ethylene glycol, diethylene glycol, propylene glycol, dipropylene glycol, 1,4-butanediol, neopentylglycol, 1,6-hexanediol, 1,8-octamethylene diol); low molecular weight diols having cyclic groups (e.g. 1,4-bis(2-hydroxyethoxy phenyl) propane); trihydric alcohols (e.g. glycerol, trimethylolpropane, hexanetriol); polyhydric alcohols having a functionality of at least 4 (e.g. sorbitol, sucrose); and alkanolamines having 2 to 6 carbon atoms in alkanol groups (e.g. triethanolamine, methyldiethanolamine). Moreover, aliphatic monohydric alcohols having 1 to 12 carbon atoms (e.g. ethanol, methanol, pentanol, dodecanol) may be used in parts of these alcohols.

The polyoxyalkylene polyols (h2) include adducts of alkylene oxides to the alcohols (h1), to low molecular weight amines, to phenols, and the like.

The low molecular weight amines include low molecular weight polyamines such as ethylene diamine, tetramethylene diamine, and hexamethylene diamine; and low molecular weight monoamines such as n-butyl amine and stearyl amine. The phenols include alkyl phenol, hydroquinone, bisphenol A, and the like.

Examples of the alkylene oxides to be added include alkylene oxides having 2 to 4 carbon atoms, e.g. ethylene oxide, propylene oxide, and butylene oxide, and combinations of these (in the case of a combination, either block or random addition may be used).

Specific examples of the polyoxyalkylene polyols (h2) include polyoxypropylene glycol, polyoxypropylene triol, polyoxyethylene polyoxypropylene glycol, polyoxyethylene polyoxypropylene triol, polyoxypropylene tetraol, polyoxytetramethylene glycol, and the like.

Examples of the polyester polyols (h3) include (h31) to (h33) below:ps
(h31) condensed polyester polyols obtained by reacting polyhydric alcohols having a functionality of at least 2 with dicarboxylic acids;
(h32) polylactone polyols obtained by the ring-opening polymerization of lactone; and
(h33) polycarbonate polyols obtained by the reaction between ethylene carbonate and 1,6-hexane diol.

The dicarboxylic acids in the condensed polyester polyols (h31) may be, for example:
aliphatic dicarboxylic acids having 3 to 12 carbon atoms (e.g. succinic acid, adipic acid, sebacic acid, glutaric acid, azelaic acid, maleic acid, fumaric acid);
aromatic dicarboxylic acids having 8 to 16 carbon atoms (e.g. terephthalic acid, isophthalic acid);
anhydrides, lower alkyl esters having 1 to 4 carbon atoms in alkyl groups, and acid halides (e.g. acid chloride) of these dicarboxylic acids; and
mixtures of two or more of these.

An example of the lactone in the polylactone polyols (h32) is ε-caprolactone.

Specific examples of these polyester polyols (h3) include polyethylene adipate, polybutylene adipate, polyhexamethylene adipate, polyneopentyl adipate, polyethylene polypropylene adipate, polyethylene butylene adipate, polybutylene hexamethylene adipate, polydiethylene adipate, poly(polytetramethylene ether)adipate, polyethylene azelate, polyethylene sebacate, polybutylene azelate, polybutylene sebacate, polyethylene terephthalate, polycaprolactone diol, polycarbonate diol, and the like.

Specific examples of the polyolefin polyols (h4) include polybutadiene polyol, hydrogenated polybutadiene polyol, polyisoprene polyol, and the like.

Specific examples of the acrylic polyols (h5) include copolymers of hydroxyethyl acrylate and ethyl acrylate, copolymers of hydroxyethyl acrylate, ethyl acrylate and styrene, and the like.

The castor oil based polyols (h6) include: (h61) castor oil; (h62) polyester polyols of castor oil fatty acids and polyhydric alcohols or polyoxyalkylene polyols; and mixtures of two or more of these.

Specific examples of (h62) include mono-, di- or triester of castor oil fatty acid and trimethylol propane; and mono- or diester of castor oil fatty acid and polyoxypropylene glycol.

The polymer polyols (h7) include those obtained by polymerizing at least one selected from the ethylenic unsaturated monomers described in JP 4-292683 A, for example, styrene, (meth)acrylic acid, methyl(meth)acrylate, (meth)acrylamide, (meth)acrylonitrile, ethylene, hexene, and the like, in polyols such as (h2) to (h6). Moreover, the " . . . (meth)acryl . . . " herein refers to " . . . acryl . . . " and/or " . . . methacryl . . . ".

The content of the ethylenic unsaturated monomer units in the polymer polyols is usually from 0.1 to 90 wt. %, preferably from 5.0 to 80 wt. % in total polyols.

As a process for producing the polymer polyols (h7), for example, there is a method of polymerizing an ethylenic unsaturated monomer in a polyol in the presence of a polymerization initiator (e.g. radical generating agent, etc.). (See, for example, the process described in U.S. Pat. No. 3,383,351.)

Among the above-mentioned examples of the active hydrogen containing compounds (h), particularly preferable are ethylene oxide adducts among the polyoxyalkylene polyols (h2). It is preferable that ethylene oxide adducts are used singly or as a part of the active hydrogen containing compound (h). By using ethylene oxide adducts, dispersion property of the urethane prepolymer (c) is increased in the preparation of the aqueous mixture.

The NCO content in the urethane prepolymer (c) is preferably from 0.5 to 30 wt. %. Moreover, with regard to the properties of the urethane prepolymer (c), although not particularly limited, it is preferably in a liquid state at room temperature and has certain degrees of molecular weight and molecular composition. The number average molecular weight of (c) is preferably from 1,000 to 50,000. The urethane prepolymer (c) may be produced, for example, by putting an organic polyisocyanate (n) and an active hydrogen containing compound (h) in a reaction vessel, and allowing them to react at a temperature of 50 to 120° C.

The content of the urethane prepolymer (c) units in the foam of the present invention, i.e. the content of (c) to total solids in the production of the foam, is usually from 5 to 30 wt. %, preferably from 7 to 25 wt. %, in view of the effect of reducing brittleness and the fire-proofing performance of the foam.

Examples of the powdery boric acid compound (d) include boric acids such as orthoboric acid, metaboric acid and tetraboric acid, multivalent metal salts of these boric acids, and mixtures of two or more of these. The multivalent metals in the multivalent metal salts may be, for example, alkali earth metals (e.g. magnesium, calcium, barium), metals belonging to group IIIa or group IVa of the periodic table (e.g. aluminum, germanium, tin), and transition metals (e.g. iron, cobalt, nickel, copper, zinc).

Among these multivalent metals, preferable are magnesium, calcium, aluminum, iron, and zinc.

The average particle diameter of the powdery boric acid compound (d) is usually from 0.1 to 200 μm, preferably from 1 to 100 μm, in view of the compressive strength of the foam.

Other than adding in the form of multivalent metal borates, the multivalent metal salts also can be formed into multivalent metal borates by adding metal compounds that are chemically active to boric acid, e.g. multivalent metal oxides such as magnesium oxide or calcium oxide, or multivalent metal hydroxides such as aluminum hydroxide, magnesium hydroxide, or calcium hydroxide, to the raw material mixture separately from boric acid, and allowing the mixture to react.

Among the above examples of the powdery boric acid compound (d), preferable are orthoboric acid, metaboric acid, tetraboric acid, magnesium borate, calcium borate, aluminum borate, iron borate, zinc borate, and mixtures of two or more of these.

The content of the powdery boric acid compound (d) in the foam of the present invention, i.e. the content of (d) to total solids in the production of the foam is usually from 1 to 50 wt. %, preferably from 3 to 40 wt. %, in view of the strength of the burned and carbonized foam and the blowing ratio of the foam.

The foam of the present invention may contain an inorganic filler (e) as needed in view of the properties and the cost. Examples of the inorganic filler (e) include (e1) to (e5) below:

(e1) cement: portland cement, silica cement, alumina cement, blastfurnace cement, fly ash cement, white cement, etc.

(e2) clay mineral: montmorillonite, bentonite, mica, sericite, kaoline, talc, fillite, zeolite, etc.

(e3) inorganic lightweight aggregate: pearlite, silas balloon, etc.

(e4) inorganic fiber: carbon fiber, asbestos, rock wool, glass fiber, ceramic fiber, potassium titanate fiber, steel fiber, etc.

(e5) other water-insoluble inorganic powder material: fly ash, silica fume, silicastone powder, ceramic powder, aluminum hydroxide, alumina, calcium sulfate, etc.

The choice of the above examples of (e) is not particularly limited, and they may be added either singly or in arbitrary combinations depending on the requirements of the foam properties, the cost, and the like.

For example, the addition of the cement (e1) improves the hardness of the foam. Alumina cement is preferably used among the cements (e1) because it has a lower alkalinity among cements, and thus has a low reactivity to the phosphoric acid compound (a1) and/or the sulfuric acid compound (a2).

The addition of the inorganic fiber (e4) improves the tensile strength, the bending strength, and the like, and also improves the shape-retention property when organic materials in the foam are burned. Moreover, the addition of the aluminum hydroxide among (e5) improves the fire-proofing performance. Besides, the above examples of (e) also can be used as extending agents mainly for the reduction of the cost.

The amount of (e) added is not particularly limited, and it is usually not more than 1800 parts by weight, preferably not more than 500 parts by weight with respect to 100 parts by weight of the phosphoric acid compound (a1) and/or the sulfuric acid compound (a2).

Organic fibers also can be used in place of or in combination with the inorganic fiber (e4). Organic fibers also have the effect of improving the tensile strength, bending strength, and the like of the foam.

The organic fibers include vinylon fiber, polyamide fiber, acrylic fiber, polyester fiber, polypropylene fiber, cellulose fiber, and the like. However, the amount of the organic fibers needs to be within the range that does not cause any problem in view of the level of the fire-proofing performance required for the foam.

When the content of the urethane prepolymer (c) is within the above-mentioned preferable range, the foam of the present invention exhibits a considerably high fire-proofing performance. However, in order to provide a greater fire-proofing property, a flame retardant also may be added to the components and subjected to foaming and curing.

Examples of the flame retardant include non-halogen phosphate esters (e.g. triphenyl phosphate, cresyl diphenyl phosphate, ammonium polyphosphate), halogen containing phosphate esters (e.g. tris(chloroethyl)phosphonate, tris (dichloropropyl)phosphate, tris(tribromophenyl)phosphate, tris(dibromopropyl)phosphate), flame retardants containing active hydrogen (e.g. di(isopropyl)-N,N-bis(2-hydroxyethyl)aminomethyl phosphate, alkylene oxide adducts of brominated bisphenol A), antimony trioxide, antimony pentaoxide, zinc oxide, and the like. These examples may be used either singly or in combination of two or more types.

The amount of the flame retardant is usually from 0.1 to 100 parts with respect to 100 parts by weight of the urethane prepolymer.

According to the process of the present invention, the foam of the present invention is obtained by mixing components comprising the phosphoric acid compound (a1) and/or sulfuric acid compound (a2), the blowing agent (b), the urethane prepolymer (c) having NCO groups, the powdery boric acid compound (d), and as needed the inorganic filler (e) so as to prepare an aqueous mixture, and thereby foaming and curing the mixture.

It is not necessary to add water to the aqueous mixture as long as the mixture has a water content sufficient to enable slurrying. The larger the water content, the more required time and labor for drying the material that is foamed and cured. The amount of water is not particularly limited, but it is usually such that the aqueous mixture has a concentration of about 50 to 90 wt. %.

In the process of the present invention, in order to control the curing speed of the prepolymer (c), for example, a catalyst may be added.

Examples of the catalyst include: metal-based catalysts such as dibutyl tin dilaurate, alkyl titanate, organosilica titanate, tin octoate, lead octoate, zinc octoate, bismuth octoate, dibutyl tin diorthophenyl phenoxide, reaction products of tin oxides and ester compounds (e.g. dioctyl phthalate), and the like; and amine-based catalysts such as monoamines (e.g. triethyl amine), diamines (e.g. N,N,N',N'-tetramethyl ethylene diamine), triamines (e.g. N,N,N',N", N"-pentamethyl diethylene triamine), and cyclic amines (e.g. triethylene diamine), and the like. The catalyst may be used either as a single metal-based catalyst or amine-based catalyst, or in combinations of metal-based catalysts and amine-based catalysts.

The amount of the catalyst is usually from 0.001 to 5 parts with respect to 100 parts of the prepolymer (c).

In the process of the present invention, in order to control the cell structure of the foam, a foam stabilizer may be added.

The foam stabilizer may be known silicone-based foam stabilizers, for example, "SH-192", "SH-193", and "SH-194," produced by TORAY DOW CORNING SILICONE CO., Ltd.; "TFA-4200," produced by TOSHIBA SILICONE CO., LTD.; "L-5320", "L-5340" and "L-5350," produced by NIPPON UNICAR COMPANY LTD.; and "F-121" and "F-122," produced by Shin-Etsu Silicon CO., Ltd. The amount of the foam stabilizer is usually from 0.001 to 3 parts by weight with respect to 100 parts by weight of the urethane prepolymer.

In the process of the present invention, as methods of foaming and curing by mixing respective components, there are various methods as exemplified in [1] to [5] below.

[1] A method of mixing the phosphoric acid compound (a1) and/or the sulfuric acid compound (a2), the urethane prepolymer (c), and water, and thereafter admixing a combination of the blowing agent (b), the powdery boric acid compound (d), and as needed the inorganic filler (e), and thereby foaming and curing the mixture.

[2] A method of mixing a mixture component of the phosphoric acid compound (a1) and/or the sulfuric acid compound (a2) and water, with another mixture component of the prepolymer (c), the blowing agent (b), the powdery boric acid compound (d), and as needed the inorganic filler (e), and thereby foaming and curing the mixture.

[3] A method of mixing a mixture component of the phosphoric acid compound (a1) and/or the sulfuric acid compound (a2), water, and the powdery boric acid compound (d), with another mixture component of the prepolymer (c), the blowing agent (b), and as needed the inorganic filler (e), and thereby foaming and curing the mixture.

[4] A method of mixing a mixture component of the phosphoric acid compound (a1) and/or the sulfuric acid compound (a2), the prepolymer (c), and a portion of water, and then admixing a slurried component prepared in advance by mixing the blowing agent (b), the powdery boric acid compound (d), and as needed the inorganic filler (e), and the rest of water, and thereby foaming and curing the mixture.

[5] A method of mixing a mixture component of the phosphoric acid compound (a1) and/or the sulfuric acid compound (a2), the powdery boric acid compound (d), water, and as needed the inorganic filler (e), with a component in which a blowing agent (b) is dispersed in the prepolymer (c), and thereby foaming and curing the mixture.

Among these methods preferable are [1], [2], [3], and [5].

The foam of the present invention is obtained by mixing respective components based on the above-mentioned method, and thereafter allowing the mixture to stand still under the conditions of room temperature and normal pressure, according to the process of the present invention. The mixed solution (slurry) is foamed within several minutes to several tens of minutes after the start of the mixing, and then curing is completed, so that a foam is formed. However, in the case of low temperature in winter, or in the case that it is desired to shorten the time for foaming and curing in the process, the mixed solution may be heated to approximately 50° C. during the foaming and curing.

According to the process of the present invention, the foams as follows can be produced:

① a foam of the present invention that is molded by pouring the raw material mixture into a mold; and ② a foam of the present invention that is applied onto any substrate such as a wall surface, or filled into any open space.

In the case of a molded foam, the foam may be formed by the above exemplified method using a mold or the like with an arbitrary shape (e.g. a mold of a large panel). In the case of an applied foam, the foam may be formed by applying a mixed material prepared by the above-mentioned method by means of spraying, troweling, etc.

The specific gravity of the foam of the present invention can be adjusted in a wide range by increasing or decreasing the quantity of the blowing agent (b). Moreover, the obtained foam is not brittle on its surface even when the specific gravity is as low as not more than 0.1. By adjusting the composition and the blending ratio, foams with a wide variety of properties from hard to soft can be obtained.

Moreover, as to the heat insulating performance of the foam, a low thermal conductivity of, for example, not more than 0.04 kcal/m.hr.° C., can be provided by controlling the specific gravity. In addition, the foam also has a fire-proofing property corresponding to the levels of non-combustible to semi-non-combustible materials. Thus, the foam of the present invention is regarded as having excellent properties as compared to conventional heat insulating materials such as glass wool, hard polyurethane foams, and the like.

Therefore, the foam of the present invention can be used as heat insulating materials for large exterior or interior wall panels, sound insulating materials, fireproof materials, fireproof covering materials, lightweight aggregates, heat insulating materials for fireproof safe, or the like.

Hereinafter, the present invention will be explained further with reference to the following non-limiting examples. In the following production examples and examples and comparative examples, "part" denotes "part by weight".

PRODUCTION EXAMPLE 1

[Production of the Urethane Prepolymer (c)]

The following urethane prepolymers (c-1) and (c-2) having NCO groups were obtained by putting necessary raw material components into a four-neck separable flask, and allowing them to react at 90° C. for 5 hours.

(c-1): A prepolymer obtained by reacting 420 parts by weight of polyoxyethylene polyoxypropylene glycol [trade name: "NEWPOL PE-62," produced by Sanyo Chemical Industries, Ltd.] with 100 parts by weight of TDI [trade name: "CORONATE T-80," produced by NIPPON POLYURETHANE INDUSTRY CO., LTD.]. The prepolymer had an NCO content of 6.2 wt. %, and was a resin solution that was viscous at room temperature.

(c-2): A prepolymer obtained by reacting 150 parts by weight of polyoxyethylene polyoxypropylene triol [trade name: "SANNIX GL-3000," produced by Sanyo Chemical Industries, Ltd.] with 100 parts by weight of crude MDI [trade name: "Millionate MR-100," produced by NIPPON POLYURETHANE INDUSTRY CO., LTD.]. The prepolymer had an NCO content of 10.0 wt. %, and was a resin solution that was viscous at room temperature.

Examples 1 to 12, Comparative Examples 1 to 4

In each of Examples 1 to 12 and Comparative Examples 1 to 4, the phosphoric acid compound (a1) and/or the sulfuric acid compound (a2), the prepolymer (c), and tap water were stirred uniformly with a homomixer based on the composition shown in Tables 1 and 2 below. To the stirred mixture obtained, the blowing agent (b) and the powdery boric acid compound (d) were further added in Examples 1, 3, 5, 7, 9, and 11; the blowing agent (b), the powdery boric acid compound (d), and the inorganic filler (e) were further added in Examples 2, 4, 6, 8, 10, and 12; the blowing agent (b) was further added in Comparative Examples 1 and 3; and the blowing agent (b) and the inorganic filler (e) were further added in Comparative Examples 2 and 4; respectively, and were stirred and mixed. Then, each mixture was poured into a mold (50×30×3 cm) and allowed to foam freely, and thereby molded foams of Examples 1 to 12 and Comparative Examples 1 to 4 were obtained.

TABLE 1

| Mixed Component | Mixed Amount (part by weight) Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (a) a1-1 | 500 | 400 | | | 500 | 400 | | | 250 | 200 | | |
| a1-2 | | | 500 | 400 | | | 500 | 400 | | | | |
| a1-3 | | 100 | | 100 | | 100 | | 100 | | 100 | | |
| a2-1 | | | | | | | | | 200 | 200 | 400 | 400 |
| (b) b-1 | 150 | 150 | 150 | 150 | 150 | 150 | 150 | 150 | 150 | 150 | 150 | 150 |
| (c) c-1 | 100 | 350 | | | 100 | 350 | | | 100 | 350 | 100 | 350 |
| c-2 | | | 100 | 350 | | | 100 | 350 | | | | |
| (d) d-1 | 200 | 150 | 200 | 800 | | | | | 200 | 150 | 200 | 150 |
| d-2 | | | | | 200 | | | 800 | | | | |
| d-3 | | | | | | 150 | 200 | | | | | |
| Tapwater | 500 | 500 | 500 | 500 | 500 | 500 | 500 | 500 | 500 | 500 | 500 | 500 |
| (e) e-1 | | 300 | | 500 | | 300 | | 500 | | 300 | | 300 |

TABLE 2

| Mixed Component | Mixed Amount (part by weight) Comparative Example | | | |
|---|---|---|---|---|
| | 1 | 2 | 3 | 4 |
| (a) | | | | |
| a1-1 | 500 | 400 | 250 | 200 |
| a1-3 | | 100 | | 100 |
| a2-1 | | | 200 | 200 |
| (b) b-1 | 150 | 150 | 150 | 150 |
| (c) c-1 | 100 | 350 | 100 | 350 |
| Tap water | 500 | 500 | 500 | 500 |
| (e) e-1 | | 300 | | 300 |

(Note 1) The compounds expressed by abbreviations are as follows:
(a1) phosphoric acid compound
a1-1: calcium dihydrogenphosphate
a1-2: magnesium dihydrogenphosphate
a1-3: phosphoric acid
(a2) sulfuric acid compound
a2-1: calcium hydrogen sulfate
(b) blowing agent
b-1: magnesium carbonate
(c) the urethane prepolymer
c-1, c-2: the prepolymers obtained in Production Example 1
(d) powdery boric acid compound
d-1: orthoboric acid (powdery; average particle diameter of 75 μm)
d-2: barium borate (powdery; average particle diameter of 7 μm)
d-3: zinc borate (powdery; average particle diameter of 7 μm)
(e) inorganic filler
e-1: aluminum hydroxide Test Example 1

Evaluation of the Foams of Examples 1 to 12 and Comparative Examples 1 to 4

The foams of Examples 1 to 12 and Comparative Examples 1 to 4 were allowed to stand in a well-ventilated room for 1 month, followed by drying in a drier at 40° C. for 120 hours. Then, the foams were allowed to stand in a desiccator for 24 hours, and subjected to testing according to the following methods.

[Methods of Testing the Foam Properties]

(1) Thermal Conductivity

JIS A-1412 (the method of measuring thermal conductivity of heat insulating boards).

(2) Level of Fire-Proofing Performance

The fire-proofing performance was measured in accordance with the surface testing methods specified in Notification No. 1231 of Ministry of Construction of Japan (the method of testing semi-non-combustible materials and flame retardant materials) and Notification No. 1828 of Ministry of Construction of Japan (the method of testing non-combustible materials), respectively.

Furthermore, a square of 30 mm was cut from the foam after the combustion test, and measured for compressive strength.

(3) Compressive Strength

JIS K-7220 (the method of compression test for hard plastic foams).

[Results of Tests]

Table 3 shows the results of the tests of the properties and appearance observation for each foam.

TABLE 3

| Example | Density | Thermal Conductivity | Level of Fire-Proofing Performance | Compressive Strength | Features of Appearance of the Foam |
|---|---|---|---|---|---|
| 1 | 45 | 0.036 | Non-combustible | 0.21 | Soft, flexible, and has rebound resilience. |
| 2 | 80 | 0.046 | Semi-non-combustible | 0.53 | Soft, highly flexible, and has high rebound resilience. |
| 3 | 46 | 0.034 | Non-combustible | 0.28 | Soft, flexible, and has rebound resilience. |
| 4 | 80 | 0.045 | Semi-non-combustible | 0.54 | Soft, highly flexible, and has high rebound resilience. |
| 5 | 45 | 0.036 | Non-combustible | 0.21 | Soft, flexible, and has rebound resilience. |

TABLE 3-continued

| | Density | Thermal Conductivity | Level of Fire-Proofing Performance | Compressive Strength | Features of Appearance of the Foam |
|---|---|---|---|---|---|
| 6 | 80 | 0.046 | Semi-non-combustible | 0.53 | Soft, highly flexible, and has high rebound resilience. |
| 7 | 46 | 0.034 | Non-combustible | 0.28 | Soft, flexible, and has rebound resilience. |
| 8 | 80 | 0.045 | Semi-non-combustible | 0.54 | Soft, highly flexible, and has high rebound resilience. |
| 9 | 50 | 0.037 | Non-combustible | 0.49 | Soft, flexible, and has rebound resilience. |
| 10 | 81 | 0.045 | Semi-non-combustible | 0.49 | Soft, highly flexible, and has high rebound resilience. |
| 11 | 52 | 0.037 | Non-combustible | 0.21 | Soft, flexible, and has rebound resilience. |
| 12 | 83 | 0.046 | Semi-non-combustible | 0.51 | Soft, highly flexible, and has high rebound resilience. |
| Comparative Example | | | | | |
| 1 | 43 | 0.034 | Non-combustible | 0.01 | Soft, flexible, and has rebound resilience. |
| 2 | 82 | 0.048 | Semi-non-combustible | 0.01 | Soft, highly flexible, and has high rebound resilience. |
| 3 | 48 | 0.036 | Non-combustible | 0.01 | Soft, flexible, and has rebound resilience. |
| 4 | 80 | 0.044 | Semi-non-combustible | 0.01 | Soft, highly flexible, and has high rebound resilience. |

(Note)
Units: Density: $kg/m^3$, Thermal Conductivity: $kcal/mhr° C.$, Compressive Strength: $kgf/cm^2$.

The inorganic/organic composite foam of the present invention and the process for producing the same have effects as follows:

(1) The foam of the present invention is reduced significantly in brittleness that has been a drawback in conventional foams obtained from phosphoric acid compounds: and ① when the foam has a high blowing ratio, in spite of being an inorganic/organic composite, it has flexibility and rebound resilience as if being a flexible polyurethane foam;

② the blowing ratio of the foam can be adjusted so as to obtain various types of foams from soft to hard foams; and ③ brittleness is reduced in both soft and hard foams.

(2) Because the foam has a sufficient strength that can be used in practice without problem even with a low specific gravity and a high blowing ratio, lightweight panels excellent in heat insulation and the like can be made therefrom.

(3) Since the foam can be produced under the conditions of room temperature and normal pressure, special reaction equipment such as for autoclave curing etc. is not required.

(4) The foam can be made porous and be cured easily in a mold having a shape as desired. Moreover, the foam also can be formed by applying to a wall surface by means of troweling or spraying, etc., and curing.

(5) While its appearance and performance are nearly at the same levels of as those of conventional polyurethane foams and polystyrene foams, the foam has a fire-proofing property at a level corresponding to non-combustible materials to semi-non-combustible materials, which is greater than the level of the conventional organic heat-insulating materials. Moreover, it has an increased strength after combustion, and thus can provide the market with materials having a high safety in terms of disaster prevention.

INDUSTRIAL APPLICABILITY

Because the foam of the present invention has the above-mentioned effects, for example, it is used suitably in the applications as follows, utilizing its properties including fire-proofing performance, heat insulation, elasticity, flexibility, strength, and the like.

① Substitute for conventional organic foams such as polyurethane foams and polystyrene foams that have been used in applications that requires fire-proofing performance, e.g. trains, automobiles, housing, buildings, and the like. For example, heat insulating materials for exterior and interior wall panels, sound insulating materials for floor and wall surfaces, and fireproof materials.

② Other applications, for example: heat insulating materials for fireproof safes, freezers, refrigerators, and the like; fireproof covering materials; lightweight aggregates; filling materials for cavities; and synthetic wood with fire-proofing performance.

What is claimed is:

1. An inorganic/organic composite foam having an inorganic foam structure obtained from at least one of a phosphoric acid compound (a1) and a sulfuric acid compound (a2) with a blowing agent (b), said foam having reduced brittleness due to a physically integrated cured material of an urethane prepolymer (c) having NCO groups, the foam also containing a powdery boric acid compound (d); wherein the blowing agent (b) is a carbonate compound (b1); wherein the prepolymer (c) is derived from aromatic polyisocyanates having 6 to 20 carbon atoms and either polyoxyalkylene polyols or alcohols.

2. The foam according to claim 1, wherein the phosphoric acid compound (a1) is at least one compound selected from the group consisting of phosphoric acid, phosphoric anhydride, phosphorous acid, condensed phosphoric acid, and multivalent metal salts of these compounds, and the sulfuric acid compound (a2) is at least one compound selected from the group consisting of sulfuric acid, sulfurous acid, and multivalent metal salts of these compounds.

3. The foam according to claim 1, wherein the powdery boric acid compound (d) is at least one powdery compound selected from the group consisting of orthoboric acid, metaboric acid, tetraboric acid, magnesium borate, calcium borate, aluminum borate, iron borate, and zinc borate.

4. The foam according to claim 1, wherein the content of the powdery boric acid compound (d) is in the range of 1 to 50 wt. % of total solids in the foam.

5. The foam according to claim 1, which further contains an inorganic filler (e).

6. A process for producing an inorganic/organic composite foam having an inorganic structure, comprising: mixing components comprising a phosphoric acid compound (a1) and/or a sulfuric acid compound (a2), a blowing agent (b), an urethane prepolymer (c) having NCO groups, a powdery boric acid compound (d) and water, in combination with or without an inorganic filler (e), and thereby foaming and curing the mixture; wherein the blowing agent (b) is a carbonate compound; wherein the prepolymer (c) is derived from aromatic polyisocyanates having 6 to 20 carbon atoms and either polyoxyalkylene polyols or alcohols.

7. An inorganic/organic composite foam having an inorganic foam structure obtained from at least one of (a1) a phosphoric-containing acid or a polyvalent metal salt thereof, and (a2) a sulfuric acid or a polyvalent metal salt thereof, combined with (b) a blowing agent for (a1) or (a2), said inorganic foam structure having been improved with respect to brittleness through a cured material formed from (c) a urethane prepolymer having NCO groups that are cured with water, and (d) a powdery boric acid compound, whereby the foam has an improved strength after combustion; wherein the blowing agent (b) is a carbonate compound; wherein the prepolymer (c) is derived from aromatic polyisocyanates having 6 to 20 carbon atoms and either polyoxyalkylene polyols or alcohols.

8. The foam according to claim 1, wherein the phosphoric acid compound (a1) comprises at least one compound selected from the group consisting of phosphoric acid, magnesium dihydrogen phosphate, calcium dihydrogen phosphate, aluminum dihydrogen phosphate and zinc dihydrogen phosphate.

9. The foam according to claim 1, wherein the sulfuric acid compound (a2) comprises at least one compound selected from the group consisting of sulfuric acid, calcium hydrogen sulfate, magnesium hydrogen sulfate, aluminum hydrogen sulfate and zinc hydrogen sulfate.

10. The foam according to claim 1, wherein the blowing agent (b) is one of a carbonate compound (b1) and a light metal (b2) that generates a gas by reacting with an acid or alkali.

11. The foam according to claim 10, wherein the carbonate compound (b1) comprises at least one compound selected from the group consisting of sodium carbonate, sodium hydrogen carbonate, potassium carbonate, ammonium carbonate, calcium carbonate, barium carbonate, magnesium carbonate and zinc carbonate.

12. The foam according to claim 1, wherein a content of at least one of the phosphoric acid compound (a1) and the sulfuric acid compound (a2) in the foam is from 3 to 50 wt. %.

13. The foam according to claim 1, wherein an amount of the blowing agent (b) is from 0.1 to 200 parts by weight with respect to 100 parts by weight of at least one of the phosphoric acid compound (a1) and the sulfuric acid compound (a2).

14. The foam according to claim 1, wherein a content of the urethane prepolymer (c) units in the foam is from 5 to 30 wt. %.

15. The foam according to claim 5, wherein the inorganic filler (e) comprises at least one selected from the group consisting of cements, clay minerals, inorganic lightweight aggregates, inorganic fibers, and other water-insoluble powder materials.

16. The foam according to claim 10, wherein the carbonate compound (b1) is a compound selected from the group consisting of calcium carbonate, barium carbonate, magnesium carbonate, and zinc carbonate.

17. The foam according to claim 1, wherein the prepolymer (c) contains 0.5 wt % to 30 wt % of NCO.

* * * * *